(12) United States Patent
Fujiwara

(10) Patent No.: US 9,296,357 B2
(45) Date of Patent: Mar. 29, 2016

(54) VEHICLE FAR-SIDE AIRBAG APPARATUS

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/555,755

(22) Filed: Nov. 28, 2014

(65) Prior Publication Data

US 2015/0158453 A1 Jun. 11, 2015

(30) Foreign Application Priority Data

Dec. 6, 2013 (JP) ................. 2013-253111

(51) Int. Cl.
*B60R 21/16* (2006.01)
*B60R 21/231* (2011.01)
*B60R 21/207* (2006.01)

(52) U.S. Cl.
CPC ......... *B60R 21/23138* (2013.01); *B60R 21/207* (2013.01); *B60R 2021/23146* (2013.01)

(58) Field of Classification Search
USPC ................. 280/730.2, 743.1, 743.2
See application file for complete search history.

(56) References Cited

U.S. PATENT DOCUMENTS

| | | | | |
|---|---|---|---|---|
| 3,779,577 | A * | 12/1973 | Wilfert ................. | 280/730.1 |
| 6,199,900 | B1 * | 3/2001 | Zeigler ................. | 280/735 |
| 8,469,395 | B2 * | 6/2013 | Richez et al. ......... | 280/730.2 |
| 2005/0087959 | A1 | 4/2005 | Heuschmid et al. | |
| 2005/0236819 | A1 | 10/2005 | Riedel et al. | |
| 2007/0013174 | A1 | 1/2007 | Riedel et al. | |
| 2007/0108745 | A1 | 5/2007 | Belwafa et al. | |
| 2009/0020988 | A1 * | 1/2009 | Sato et al. ............ | 280/730.2 |
| 2010/0001500 | A1 | 1/2010 | Feller | |
| 2012/0049498 | A1 | 3/2012 | Wiik et al. | |
| 2012/0091697 | A1 | 4/2012 | Wiik et al. | |
| 2015/0108744 | A1 * | 4/2015 | Line et al. ............ | 280/730.2 |

FOREIGN PATENT DOCUMENTS

| | | |
|---|---|---|
| DE | 19603106 A1 | 7/1997 |
| DE | 19648529 C1 | 5/1998 |
| DE | 20207388 U1 | 8/2002 |
| DE | 102005034249 A1 | 2/2007 |
| DE | 102007013101 A1 | 8/2007 |
| DE | 102009019930 A1 | 2/2010 |
| DE | 102009021635 A1 | 11/2010 |

(Continued)

OTHER PUBLICATIONS

Pending International Application No. PCT/JP2014/072196 filed Aug. 25, 2014 in the name of Yusuke Fujiwara.

*Primary Examiner* — Toan To
(74) *Attorney, Agent, or Firm* — Oliff PLC

(57) ABSTRACT

A vehicle far-side airbag apparatus includes an inflator that is provided in a side portion on a vehicle width direction center side of a seatback of a vehicle seat, and generates gas by being activated; and an airbag that is fixed to a seatback frame inside the side portion, and in which an occupant restraining portion inflates and deploys toward a vehicle front side of the side portion in response to the gas being supplied into the occupant restraining portion, and a rearward extending portion inflates and deploys farther to a vehicle rear side than the portion where the airbag is fixed, in response to the gas being supplied into the rearward extending portion.

13 Claims, 6 Drawing Sheets

(56) References Cited

FOREIGN PATENT DOCUMENTS

| | | |
|---|---|---|
| GB | 2309440 A | 7/1997 |
| JP | 2005-306377 A | 11/2005 |
| JP | 2007-022526 A | 2/2007 |
| JP | 2009-280023 A | 12/2009 |
| JP | 2010-070003 A | 4/2010 |
| JP | 2012-025182 A | 2/2012 |
| JP | 2012-051557 A | 3/2012 |
| JP | 2012-081958 A | 4/2012 |
| WO | 2010/133280 A1 | 11/2010 |

* cited by examiner

VEHICLE FAR-SIDE AIRBAG APPARATUS

INCORPORATION BY REFERENCE

The disclosure of Japanese Patent Application No. 2013-253111 filed on Dec. 6, 2013 including the specification, drawings and abstract is incorporated herein by reference in its entirety.

BACKGROUND OF THE INVENTION

1. Field of the Invention

The invention relates to vehicle far-side airbag apparatus mounted in a side portion on a vehicle width direction center side of a seatback of a vehicle seat.

2. Description of Related Art

Japanese Patent Application Publication No. 2012-051557 (JP 2012-051557 A) describes an airbag apparatus (a far-side airbag apparatus) mounted in a side portion on the vehicle width direction center side of a seatback of a vehicle seat. With this far-side airbag apparatus, an airbag bag body has an inflating portion and at least one non-inflating portion, and a tether that is joined to a seatback frame passes through an opening formed in the non-inflating portion and is connected to a front end of the airbag bag body. This tether controls the deployment path of the airbag bag body at the time of a side collision, and effectively restrains an occupant.

However, depending on the tether, it may be difficult to sufficiently apply reaction force in the vehicle width direction with respect to the airbag bag body, so there is room for improvement in view of inhibiting the occupant on the side opposite the side on which the side collision occurs from moving toward the vehicle width direction center side due to inertia.

SUMMARY OF THE INVENTION

The invention thus provides a vehicle far-side airbag apparatus capable of inhibiting an occupant from moving by inertia toward a vehicle width direction center side when a side collision occurs.

A first aspect of the invention relates to vehicle far-side airbag apparatus that includes an inflator that is provided in a side portion on a vehicle width direction center side of a seatback of a vehicle seat, and generates gas by being activated; and an airbag that is fixed to a seatback frame inside the portion, and in which an occupant restraining portion inflates and deploys toward a vehicle front side of the side portion in response to the gas being supplied into the occupant restraining portion, and a rearward extending portion inflates and deploys farther to a vehicle rear side than the portion where the airbag is fixed, in response to the gas being supplied into the rearward extending portion.

In the aspect described above, when a side collision is detected, for example, the inflator is activated, and gas generated by the inflator is supplied into the airbag. As a result, the occupant restraining portion of the airbag inflates and deploys toward the vehicle front side of the side portion on the vehicle width direction center side of the seatback, and the rearward extending portion of the airbag inflates and deploys farther to the vehicle rear side than the portion where the airbag is fixed to the seatback frame. Here, when a load from an occupant that tries to move by inertia toward the vehicle width direction center side due to the impact of the side collision is applied to the occupant restraining portion, the airbag tries to rotate around a up-down axis with the portion where the airbag is fixed to the seatback frame as the fulcrum.

As a result, the rearward extending portion wants to be displaced toward the vehicle width direction outside (i.e., the seat width direction center side). Accordingly, the rearward extending portion receives a reaction force toward the vehicle width direction center side from a structure member (e.g., the rear portion of the seatback frame) of the seatback 14. Consequently, both the rotation of the airbag and the displacement of the occupant restraining portion on the vehicle width direction center side are inhibited. As a result, reaction force from the occupant restraining portion is able to be better applied to the occupant, which helps to inhibit the occupant from moving by inertia toward the vehicle width direction center side.

As described above, the vehicle far-side airbag apparatus according to the foregoing aspect of the invention helps to inhibiting an occupant from moving by inertia toward the vehicle width direction center side when a side collision occurs.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Example Embodiment

Figure 1:
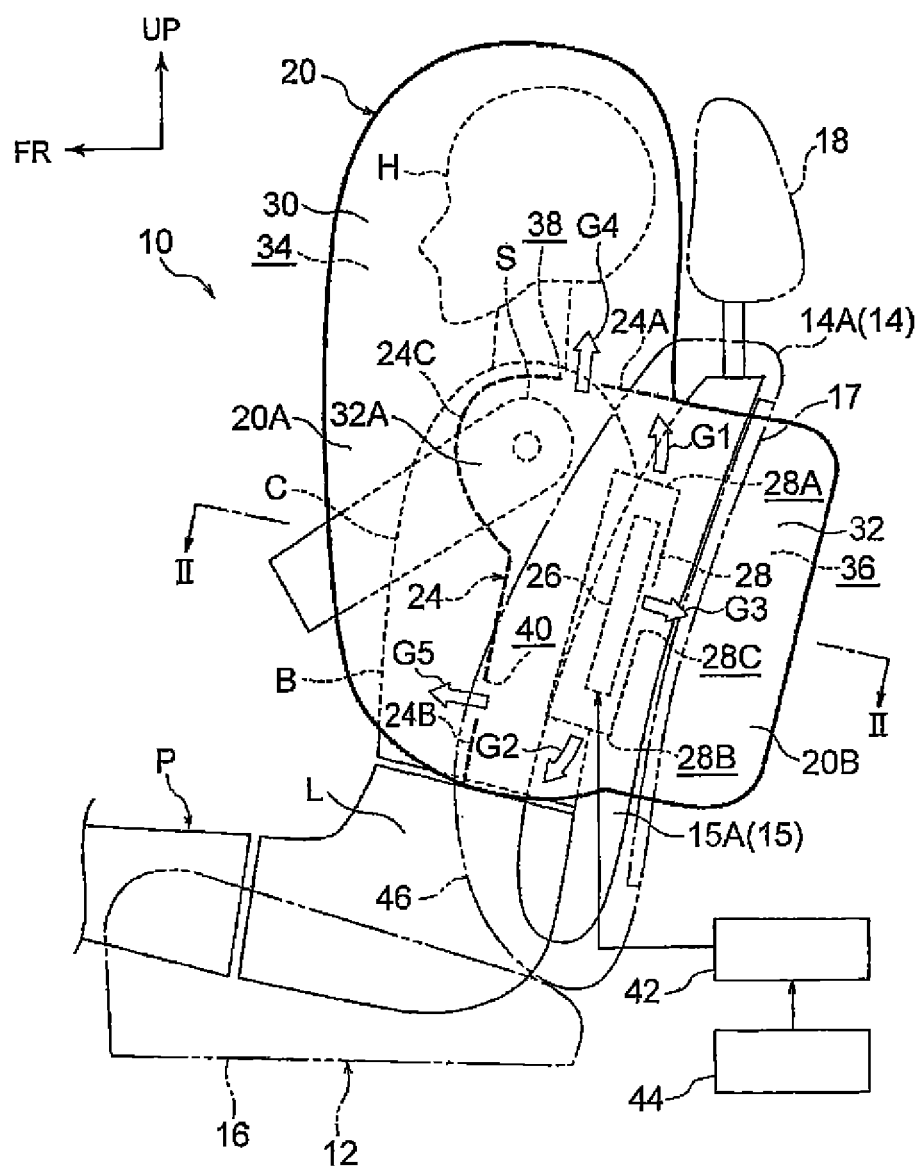
FIG. 1 is a side view of a vehicle seat equipped with a vehicle far-side airbag apparatus according to a first example embodiment of the invention, showing an airbag in an inflated and deployed state.

Hereinafter, a vehicle far-side airbag apparatus 10 according to a first example embodiment of the invention will be described with reference to FIGS. 1 to 4. In the drawings, arrow FR indicates a forward direction (advancing direction) with respect to a vehicle, arrow UP indicates an upward direction with respect to the vehicle, and arrow OUT indicates an outside in a vehicle width direction. Hereinafter, unless otherwise specified, when directions of front and rear (longitudinal), up and down (vertical), and left and right are used, they will refer to front and rear in a vehicle longitudinal direction, left and right in a vehicle lateral direction (i.e., the vehicle width direction), and up and down in a vehicle up-down direction, respectively.

(Structure)

Figure 2:
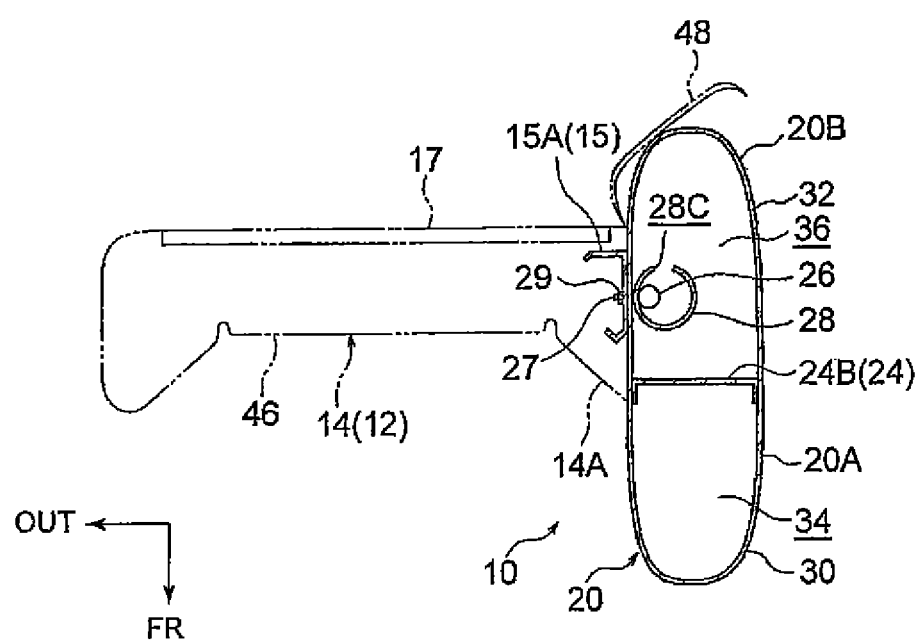
FIG. 2 is a reduced sectional view of a cross-section taken along line II-II in FIG. 1.
Figure 3:
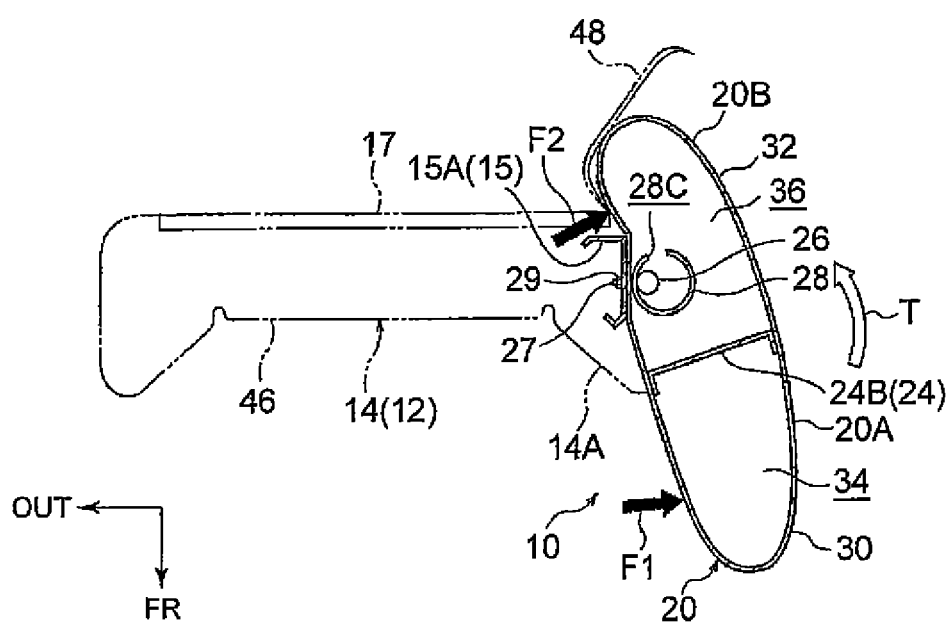
FIG. 3 is a sectional view corresponding to FIG. 2, showing a state in which a load from an occupant trying to move by inertia toward the vehicle width direction center side is input to an occupant restraining portion of the airbag.

As shown in FIGS. 1 to 3, the vehicle far-side airbag apparatus 10 according to example embodiment is a so-called far-side airbag apparatus, and is mounted to a tunnel-side side portion 14A (a side portion on a vehicle width direction center side) of a seatback 14 of a vehicle seat 12. The vehicle seat 12 is a driver's seat of a right-hand drive vehicle, for example. The seatback 14 of this vehicle seat 12 is tiltably connected to a rear end portion of a seat cushion 16, and a headrest 18 is connected to an upper end portion of the seatback 14. Also, a plastic seatback board 17 is attached to a back surface of the seatback 14. This seatback board 17 is either directly connected, or fixed via a bracket, not shown, to a seatback frame 15 that is a frame of the seatback 14, and forms a design surface of the back surface of the seatback 14.

In this example embodiment, the front-rear (longitudinal) direction, the left-right (width) direction, and the up-down direction of the vehicle seat 12 match the front-rear (longitudinal) direction, the left-right (width) direction, and the up-down direction of the vehicle. Also, in FIG. 1, a crash test dummy P, instead of an actual occupant, is seated in the vehicle seat 12. This dummy P is a WorldSID (World Side Impact Dummy) AM50 (i.e., a model covering 50% of American adult males), for example. This dummy P is seated in a standard seating position as specified by crash test law, and the vehicle seat 12 is positioned in a standard set position corresponding to this seating position. Hereinafter, the dummy P will be referred to as "seated occupant P" to facilitate understanding of the description.

The vehicle far-side airbag apparatus 10 is an apparatus for protecting an occupant on the side opposite the main collision side when the vehicle is involved in a side collision, and includes an airbag 20 (far-side airbag: bag body) arranged in the tunnel-side side portion 14A. A front-rear partitioning tether 24 (partition cloth; partition member), an inflator 26 (gas generating device), and a flow straightening cloth 28 (inner tube; flow straightening member) are arranged inside this airbag 20. Hereinafter, the constituent elements of the vehicle far-side airbag apparatus 10 will be described.

The airbag 20 is arranged (housed) inside of the tunnel-side side portion 14A in a state folded up and unitized (i.e., integrated) with the inflator 26 and the like. This airbag 20 inflates and deploys toward the vehicle width direction center side of the occupant P (i.e., the front side of the tunnel-side side portion 14A) by the pressure of the gas generated by the inflator 26 (the states shown in FIGS. 1 to 3). Unless otherwise specified, the front, rear, up, and down directions of the side airbag 20 described in the description below indicate directions when the side airbag 20 is in an inflated and deployed state, and substantially match the front, rear, up, and down directions of the seatback 14.

This airbag 20 is formed in a generally L-shaped bag shape by two pieces of base fabric that have been cut out of nylon or polyester cloth material, for example, being overlapped and the outer peripheral edge portions sewn together. This airbag 20 includes an occupant restraining portion 20A that inflates and deploys in a long shape with the length being in the vehicle up-down direction. This occupant restraining portion 20A is able to restrain from the head H to the abdomen B of the occupant P, as shown in FIG. 1. A rearward extending portion 20B extends from a lower portion of a rear end portion of this occupant restraining portion 20A. This rearward extending portion 20B is formed by the two pieces of base fabric, and is integrally formed with the occupant restraining portion 20A.

The manufacturing method of the airbag 20 is not limited to that described above and may be modified as appropriate. For example, the bag-shaped airbag 20 may alternatively be made by folding a single piece of base fabric in two and sewing the outer peripheral edge portions together. Also, for example, the occupant restraining portion 20A and the rearward extending portion 20B may be made of separate pieces of base fabric, and these may be integrally joined together by means such as sewing.

The inside of the airbag 20 is partitioned (divided) into two chambers 34 and 36 by the front-rear partitioning tether 24. This front-rear partitioning tether 24 is formed by cloth material that is the same as the base fabric of the airbag 20, which has been cut into a long strip shape, with one long side edge portion being sewn to one piece of base fabric of the airbag 20, and the other long side end portion being sewn to the other piece of base fabric of the airbag 20.

The occupant restraining portion 20A is partitioned by this front-rear partitioning tether 24 into a front bag portion 30 for restraining the head H and front portion of the chest C and abdomen B of the occupant P, and a rear bag portion 32 for restraining the shoulder S and rear portion of the chest C and abdomen B. The inside of the front bag portion 30 is a front chamber 34, and the inside of the rear bag portion 32 is a rear chamber 36. A rear portion of this rear bag portion 32 is the rearward extending portion 20B. That is, the occupant restraining portion 20A is formed by the front bag portion 30 and the front portion of the rear bag portion 32. Also, the rearward extending portion 20B is a portion where the rear bag portion 32 extends toward the vehicle rear-side. This rearward extending portion 20B is integrally formed with the rear bag portion 32 (i.e., is formed by a rear portion of the rear bag portion 32). The rearward extending portion 20B may also be formed separately from the rear bag portion 32, and then be integrally attached to the rear bag portion 32 by means such as sewing.

The front-rear partitioning tether 24 described above includes a transversely extending portion 24A that extends from an up-down middle portion of a rear end of the airbag 20 toward the front side of the seatback 14, and a up-down extending portion 24B that extends from a longitudinally (i.e., front-rear direction) middle portion of a lower end of the airbag 20 toward an upper side of the seatback 14. Furthermore, this front-rear partitioning tether 24 also includes an arc-shaped portion 24C provided between a front end of the transversely extending portion 24A and an upper end of the up-down extending portion 24B. This arc-shaped portion 24C forms an arc shape in which the side toward the front side of the seatback 14 is convex when viewed from the side, and is set to protrude farther toward the front side of the seatback 14 than the up-down extending portion 24B.

An upper communication hole 38 (an inner vent hole) that communicates an upper portion in the rear bag portion 32 with an upper portion in the front bag portion 30 in the up-down direction of the airbag 20, is formed in a front end portion of the transversely extending portion 24A. Also, a lower communication hole 40 (an inner vent hole) that communicates a lower portion in the rear bag portion 32 with a lower portion in the front bag portion 30 in the longitudinal direction of the airbag 20, is formed in a up-down middle portion of the up-down extending portion 24B.

Figure 4A:
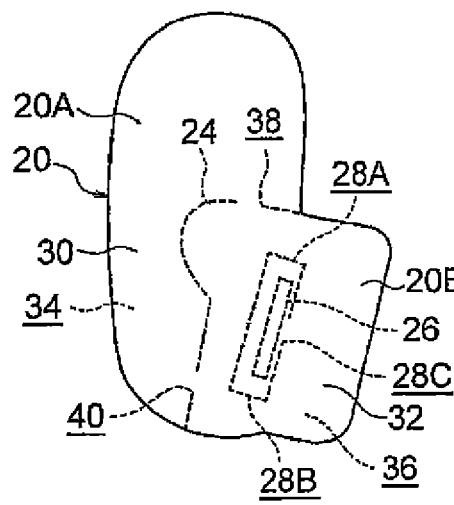
FIG. 4A is a side view illustrating the manner in which the airbag is folded, and shows the airbag before it is folded.
Figure 4B:
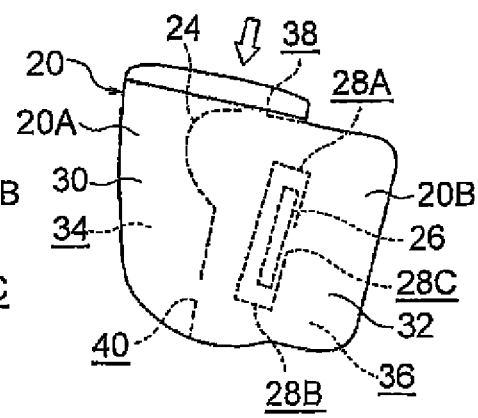
FIG. 4B is a side view illustrating the manner in which the airbag is folded, and shows an upper portion of a front bag portion in a folded state.
Figure 4C:
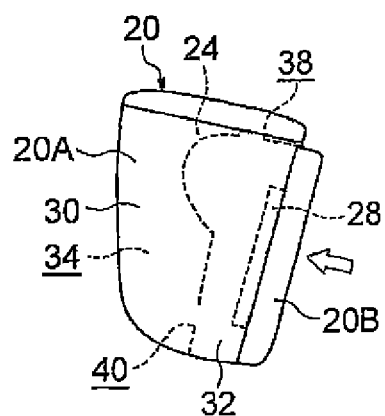
FIG. 4C is a side view illustrating the manner in which the airbag is folded, and shows a rearward extending portion in a folded state.
Figure 4D:
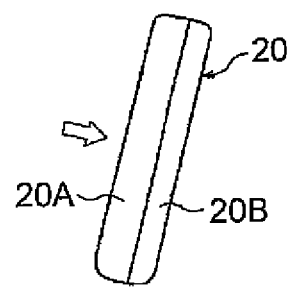
FIG. 4D is a side view illustrating the manner in which the airbag is folded, and shows the airbag in a completely folded state.

When the airbag 20 having the structure described above is folded, an upper portion of the occupant restraining portion 20A is first folded toward a up-down center portion of the occupant restraining portion 20A, as shown in FIG. 4B, from a planar deployed state (i.e., a state in which it is spread out flat) shown in FIG. 4A. Then, the rearward extending portion 20B is folded toward a connecting portion of the occupant restraining portion 20A, as shown in FIG. 4C. Next, a lower portion of the occupant restraining portion 20A is folded to near a connecting portion of the rearward extending portion 20B, together with the upper portion of the folded occupant restraining portion 20A, as shown in FIG. 4D. This completes the folding of the airbag 20. The folded airbag 20 is formed enclosed in wrap material, not shown, that easily tears from the expansion pressure of the airbag 20. A predetermined folding method that includes a roll fold, an accordion fold, or a combination of these, for example, may be employed to fold the airbag 20. Also, the folding method and order in which each portion of the airbag 20 is folded are not limited to those described above, and may be changed as appropriate.

Meanwhile, the inflator 26 is a so-called cylinder-type inflator, and is formed in a circular cylindrical shape, as shown in FIG. 1. This inflator 26 is housed in a longitudinally middle portion inside the rear bag portion 32 together with the flow straightening cloth 28. This flow straightening cloth 28 is made of the same fabric that is used for the base fabric of the airbag 20, which is sewn in a cylindrical shape, and the inflator 26 is housed inside thereof. An upper end opening 28A that opens toward the vehicle upper side is formed on an upper end portion of the flow straightening cloth 28, a lower end opening 28B that opens toward the vehicle lower side is formed in a lower end portion of the flow straightening cloth 28, and a middle opening 28C that opens toward the vehicle rear side is formed in a up-down middle portion of the flow straightening cloth 28. The inflator 26 and the flow straightening cloth 28 are arranged in the rear bag portion 32 in postures with their axial directions along the height direction of the seatback 14.

A pair of upper and lower stud bolts 27 (see FIGS. 2 and 3) protrude toward the vehicle width direction outside from an outer peripheral portion of the inflator 26. These stud bolts 27 pass through the base fabric of the airbag 20, the base fabric of the flow straightening cloth 28, and the side frame 15A of the seatback frame 15 that is the frame of the seatback 14, and nuts 29 are screwed on to the tip end sides of the stud bolts 27. As a result, the airbag 20 and the flow straightening cloth 28 are fastened to the side frame 15A of the seatback frame 15 via the inflator 26. The portion of this airbag 20 that inflates and deploys farther toward the vehicle rear side than the inflator 26 is the rearward extending portion 20B.

An ECU 42 (a controller) mounted in the vehicle is electrically connected to this inflator 26, as shown in FIG. 1. A side collision sensor 44 that detects a side collision of the vehicle is electrically connected to this side collision ECU 42. The ECU 42 and the side collision sensor 44 are structure members of the vehicle far-side airbag apparatus 10.

The ECU 42 is configured to activate the inflator 26 when a side collision of the vehicle is detected (or when it is detected that a side collision is unavoidable) based on a signal from the side collision sensor 44. More specifically, the vehicle far-side airbag apparatus 10 is mounted in the vehicle seat 12 that is the driver's seat in a right-hand drive vehicle, so when the ECU 42 detects that another vehicle has collided with a side portion (a left side portion) on the front passenger's seat side of the vehicle, the inflator 26 is activated. When a pre-crash sensor that anticipates (predicts) a side collision is electrically connected to the ECU 42, the inflator 26 may be configured to activate when the ECU 42 anticipates a side collision based on a signal from the pre-crash sensor.

When the inflator 26 is activated, gas is ejected in a radial shape from a gas ejecting portion provided in one of the upper end portion and the lower end portion of the inflator 26. The gas ejected from the gas ejecting portion is supplied from the upper end opening 28A and the lower end opening 28B of the flow straightening cloth 28 to the upper portion and lower portion inside the rear bag portion 32 (see arrows G1 and G2 in FIG. 1). Also, the gas ejected from the gas ejecting portion is ejected to the vehicle rear side from the middle opening 28C of the flow straightening cloth 28, and supplied to a rear portion inside the rear bag portion 32, i.e., into the rearward extending portion 20B (see arrow G3 in FIG. 1). Moreover, the gas that is supplied to the upper portion and lower portion inside the rear bag portion 32 passes through the upper communication hole 38 and the lower communication hole 40 formed in the front-rear partitioning tether 24, and is supplied into the front bag portion 30 (see arrows G4 and G5 in FIG. 1). As a result, the occupant restraining portion 20A of the airbag 20 inflates and deploys forward of the tunnel-side side portion 14A (i.e., toward the vehicle width direction center side with respect to the occupant P), and the rearward extending portion 20B inflates and deploys to the vehicle rear side of the inflator 26.

When the airbag 20 inflates and deploys in this way, a seatback pad, not shown, and a seat cover 46 arranged on the tunnel-side side portion 14A receive the expansion pressure of the airbag 20 and tear. As shown in FIG. 2, a side cover 48 of the seat cover 46 is configured to deploy toward the vehicle rear side together with a portion of the seatback pad.

Also, when the airbag 20 inflates and deploys as described above, after the gas that is ejected from the inflator 26 is supplied into the rear bag portion 32, it passes through the upper and lower communication holes 38 and 40 to be supplied into the front bag portion 30, so the internal pressure of the rear bag portion 32 becomes higher than the internal pressure of the front bag portion 30. That is, in this example embodiment, internal pressure regulating means that increases the internal pressure of the rear bag portion 32 so that it is higher than the internal pressure of the front bag portion 30 is formed by the inflator 26 being provided in the rear bag portion 32, and the upper and lower communication holes 38 and 40 being formed in the front-rear partitioning tether 24.

When the airbag 20 is in inflated and deployed state, the shoulder S and the rear portion of the chest C and abdomen B of the occupant P are restrained by the rear bag portion 32, while the head H and the front portion of the chest C and the abdomen B are restrained by the front bag portion 30. In this state, the up-down extending portion 24B of the front-rear partitioning tether 24 opposes the longitudinally middle portion of the chest C and abdomen B of the occupant P from the vehicle width direction center side. Also, the arc-shaped portion 24C of the front-rear partitioning tether 24 protrudes farther toward the front side of the seatback 14 than the up-down extending portion 24B, so a shoulder restraining portion 32A provided on an upper portion of the rear bag portion 32 protrudes farther in front of the seatback 14 than a lower portion of the rear bag portion 32.

Also, in this example embodiment, the rearward extending portion 20B of the airbag 20 inflates and deploys farther toward the vehicle rear side than the back surface of the seatback 14. More specifically, this rearward extending portion 20B protrudes farther toward the vehicle rear side than the seatback board 17 on the vehicle width direction center side of the seatback board 17. In this state, the vehicle width direction outside surface of the rearward extending portion 20B opposes the surface on the vehicle width direction center side of the rear portion side of the side frame 15A and the end portion on the vehicle width direction center side of the seatback board 17.

(Operation and Effects)

Next, the operation and effects of the first example embodiment will be described.

In the vehicle far-side airbag apparatus 10 having the structure described above, when the ECU 42 detects a side collision based on a signal from the side collision sensor 44, the ECU 42 activates the inflator 26. Consequently, gas is ejected into the rear bag portion 32 of the airbag 20 within which the inflator 26 is housed, and the gas within the rear bag portion 32 is supplied into the front bag portion 30 through the upper and lower communication holes 38 and 40 formed in the front-rear partitioning tether 24. As a result, the occupant restraining portion 20A of the airbag 20 inflates and deploys toward the vehicle front side of the tunnel-side side portion 14A of the seatback 14, and the rearward extending portion 20B inflates and deploys toward the vehicle rear side of a portion where the airbag 20 is fixed to the side frame 15A (i.e., toward the vehicle rear side of a portion where the inflator 26 is positioned).

Here, when a load F1 from the occupant P that tries to move by inertia toward the vehicle width direction center side by the impact of the side collision is applied to the occupant restraining portion 20A, the airbag 20 tries to rotate around a up-down axis with the inflator 26 positioned on the portion where the airbag 20 is fixed to the side frame 15A as the fulcrum (see arrow T in FIG. 3). As a result, the rearward extending portion 20B wants to be displaced toward the vehicle width direction outside (i.e., the seat width direction center side). Accordingly, the rearward extending portion 20B receives a reaction force F2 toward the vehicle width direction center side from a structure member (e.g., the rear portion of the side frame 15A) of the seatback 14. Consequently, both the rotation of the airbag 20 and the displacement of the occupant restraining portion 20A on the vehicle width direction center side are inhibited. As a result, reaction force from the occupant restraining portion 20A is able to be better applied to the occupant P, which helps to inhibit the occupant P from moving (falling over) by inertia toward the vehicle width direction center side.

In addition, in this example embodiment, the rearward extending portion 20B inflates and deploys farther toward the vehicle rear side than the back surface of the seatback 14 (i.e., than the seatback board 17). Therefore, when the load F1 from the occupant P is applied to the occupant restraining portion 20A and the rearward extending portion 20B tries to be displaced toward the seat width direction center side, the rearward extending portion 20B is able to interfere not only with the rear portion of the side frame 15A, but also with the seatback board 17 and the like. Accordingly, the rearward extending portion 20B receives an even larger reaction force F2 toward the vehicle width direction center side, so the occupant restraining portion 20A is able to be effectively inhibited from being displaced toward the vehicle width direction center side. As a result, the occupant P is able to be even further inhibited from moving by inertia toward the vehicle width direction center side.

Also, in this example embodiment, when the inflator 26 that is housed inside the rear bag portion 32 of the airbag 20 is activated, gas generated inside the rear bag portion 32 is supplied into the front bag portion 30 through the upper and lower communication holes 38 and 40 formed in the front-rear partitioning tether 24, as described above. Accordingly, the rear bag portion 32 within which the inflator 26 is housed inflates and deploys earlier and at a higher pressure than the front bag portion 30 does. The rearward extending portion 20B is provided on this rear bag portion 32. Therefore, when the load F1 from the occupant P is applied to the occupant restraining portion 20A, the high pressure rearward extending portion 20B receives the even larger reaction force F2 from the structure members of the seatback 14 (e.g., the side frame 15A and the seatback board 17 and the like). As a result, displacement of the occupant restraining portion 20A toward the vehicle width direction center side is able to be effectively suppressed, so movement by inertia of the occupant P toward the vehicle width direction center side is able to be further suppressed.

Also, in this example embodiment, the rear bag portion 32 that restrains the shoulder S as well as the rear portion of the chest C and abdomen B of the occupant P inflates and deploys earlier and at a higher pressure than the front bag portion 30 that restrains the head H and the front portion of the chest C and abdomen B of the occupant P. Therefore, the low pressure, high capacity front bag portion 30 that inflates and deploys is able to be supported by the high pressure rear bag portion 32. As a result, the front bag portion 30 is able to be inhibited from greatly swinging upon inflation and deployment, which enables the head H to be restrained more stably by the front bag portion 30.

Further, in this example embodiment, the gas ejected from the inflator 26 is supplied (distributed) to the upper portion and the lower portion, of the front bag portion 30 from the upper portion and the lower portion in the rear bag portion 32 through the upper communication hole 38 and the lower communication hole 40 of the front-rear partitioning tether 24. Moreover, the upper communication hole 38 communicates the upper portion in the rear bag portion 32 with the upper portion in the front bag portion 30, in the up-down direction of the airbag 20, and the lower communication hole 40 communicates the lower portion in the rear bag portion 32 with the lower portion in the front bag portion 30, in the longitudinal (front-rear) direction of the airbag 20. Accordingly, the gas supplied into the lower portion in the front bag portion 30 through the lower communication hole 40 will not inadvertently interfere with the gas supplied into the upper portion in the front bag portion 30 through the upper communication hole 38. As a result, the effect of stabilizing the deployment behavior of the upper portion of the front bag portion 30 (i.e., the portion for restraining the head H of the occupant P) is able to be further enhanced.

Also, in this example embodiment, the shoulder restraining portion 32A provided on the upper portion of the rear bag portion 32 protrudes farther toward the front side of the seatback 14 than the lower portion of the rear bag portion 32 (i.e., the portion for restraining the rear portion of the chest C and abdomen B of the occupant P). Accordingly, a wide shoulder S restraining area of the high pressure rear bag portion 32 is able to be ensured, so the shoulder S restraining performance is able to be improved.

Next, another example embodiment of the invention will be described. Structure and operation that are basically the same as those in the first example embodiment described above will be denoted by like reference characters as those in the first example embodiment, and descriptions thereof will be omitted.

Second Example Embodiment

Figure 5:
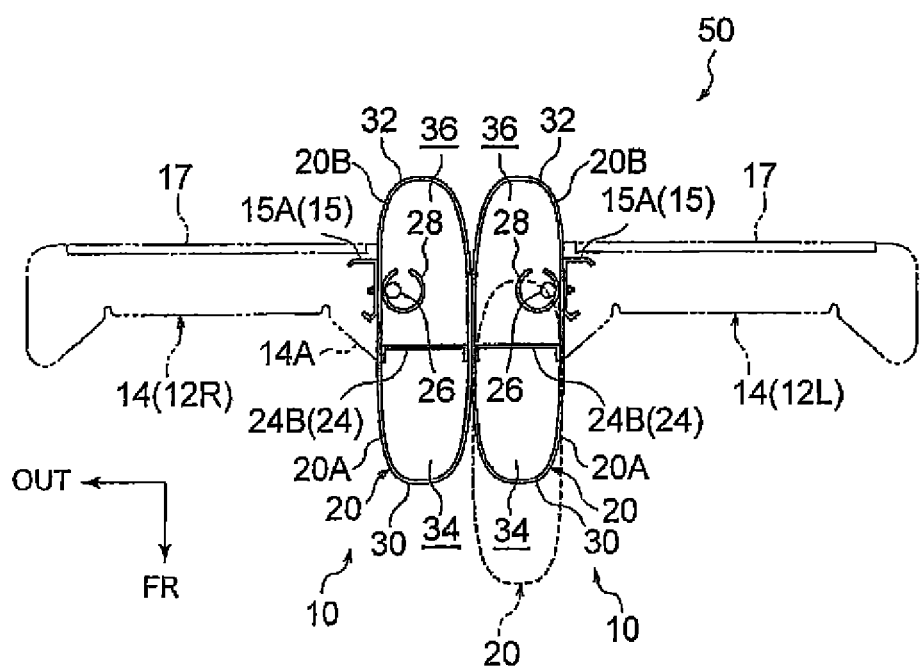
FIG. 5 is a sectional view of a second example embodiment of the invention, which corresponds to FIG. 2 showing a vehicle occupant protection apparatus formed by the vehicle far-side airbag apparatus mounted in both left and right vehicle seats.

FIG. 5 shows a view of the second example embodiment of the invention. In this example embodiment, the vehicle far-side airbag apparatus 10 according to the first example embodiment is mounted in both left and right vehicle seats 12L and 12R (here, the driver's seat and the front passenger's seat), thus forming a vehicle occupant protection apparatus 50. In FIG. 5, some of the reference characters, as well as the side cover 48, are omitted.

In this example embodiment, the inflators 26 of the vehicle far-side airbag apparatus 10 mounted in the left and right vehicle seats 12L and 12R are electrically connected to the ECU 42 (not shown in FIG. 5). The ECU 42 activates both of the left and right inflators 26 upon detecting a side collision of the vehicle based on a signal from the side collision sensor 44. That is, the ECU 42 activates both of the left and right far-side airbags. As a result, when the left and right airbags 20 inflate and deploy, the left and right airbags 20 oppose each other and either abut or be close to each other.

In this example embodiment, when the occupant P on the side opposite the collision side where the side collision occurs (i.e., the far side) strikes the far-side airbag 20, reaction force is able to be applied to the far-side airbag 20 by the collision-side (near-side) airbag 20. Accordingly, movement by inertia of the occupant P toward the vehicle width direction center side is able to be even better inhibited. Moreover, with this airbag 20, the rear bag portion 32 is at a higher pressure than the front bag portion 30 is, so an even greater reaction force is able to be obtained by the left and right rear bag portions 32 interfering with one another. Also, the reaction force effect described above is also able to be obtained even if the left and right airbags 20 are offset longitudinally (front-rear), by offsetting the seat sliding position of the left and right vehicle seats 12L and 12R longitudinally (i.e., in the front-rear direction).

Figure 6:
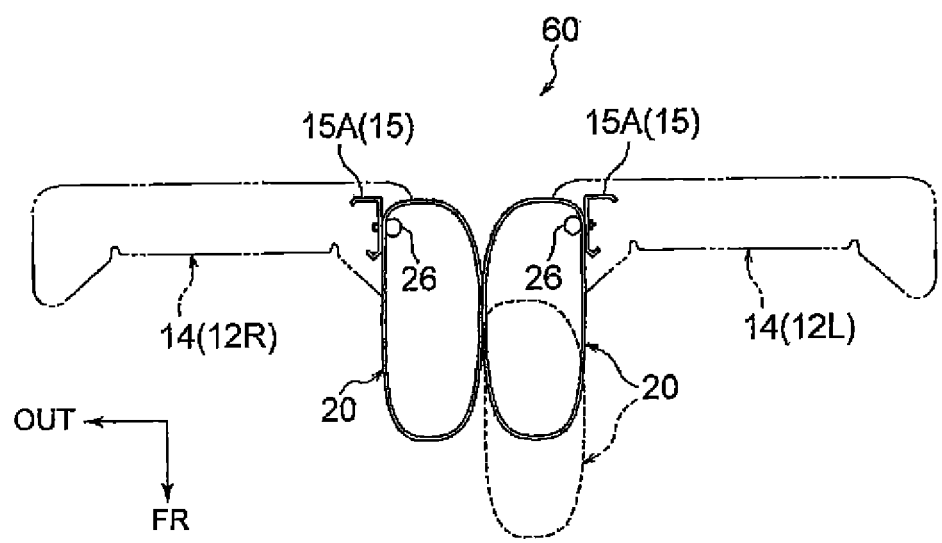
FIG. 6 is a plan view of a modified example of the vehicle occupant protection apparatus shown in FIG. 5.

In the vehicle far-side airbag apparatus 10 mounted in both the left and right vehicle seats 12L and 12R, the ECU 42 may also be configured to ignite the near-side inflator 26 later than the far-side inflator 26 (i.e., a delayed ignition). As a result, the reaction force that the far-side airbag 20 receives from the near-side airbag 20 is able to be increased. Also, as with a modified example 60 shown in FIG. 6, even if the airbag 20 is not provided with the rearward extending portion 20B and the front-rear partitioning tether a reaction force is able to be applied to the far-side airbag 20 by the near-side airbag 20, so the reaction force effect described above is able to be obtained.

Supplemental Description of the Example Embodiments

In the example embodiments described above, the airbag 20 is divided into the front bag portion 30 and the rear bag portion 32 by the front-rear partitioning tether 24, but the invention is not limited to this. That is, the front-rear partitioning tether 24 may also be omitted. In this case, instead of the front-rear partitioning tether 24 (partition cloth), a thickness restricting tether may be set in the longitudinally middle portion of the airbag 20 to restrict the inflating width of the airbag 20 in the vehicle width direction.

Also, in the example embodiments described above, the airbag 20 is formed of a size that is able to restrain from the head H to the abdomen of the occupant P, but the invention is not limited to this. That is, a waist restraining portion that restrains the waist L of the occupant P may be provided on a lower end portion of the airbag 20 (i.e., the airbag 20 may be formed of a size that is able to restrain from the head H to the waist L).

Also, the structure of the front-rear partitioning tether in the invention is not limited to the structure of the front-rear partitioning tether 24 in the example embodiments. That is, the shape of the front surface of the shoulder restraining portion 32A, the width dimension of the shoulder restraining portion, and the position and number of the communication holes and the like may be changed as appropriate.

Further, in the example embodiments described above, the rearward extending portion 20B of the airbag 20 inflates and deploys farther toward the vehicle rear side than the back surface of the seatback 14, but the invention is not limited to this. The rearward extending portion need only inflate and deploy farther toward the vehicle rear side than the portion where the airbag is fixed to the seatback frame.

Also, in the example embodiments described above, the airbag 20 is fixed to the side frame 15A of the seatback frame 15 via the inflator 26, but the invention is not limited to this. For example, the airbag may also be fixed to the seatback frame via a diffuser mounted to the inflator. In this case, the position where the diffuser is positioned in the airbag is the position where the airbag is fixed to the seatback frame.

Also, in the example embodiments described above, the vehicle far-side airbag apparatus 10 is mounted in a seat in a first row (i.e., the driver's seat and the front passenger's seat), but it is not limited to this. The vehicle far-side airbag apparatus of the invention may also be applied to a seat in a second row or a seat in a third row in a vehicle.

In addition, the invention may be carried out with various modifications without departing from the scope thereof. Also, the scope of the invention is not limited by the example embodiments described above.

What is claimed is:

1. A vehicle far-side airbag apparatus comprising:
   an inflator that is provided in a side portion on a vehicle width direction center side of a seatback of a vehicle seat, and generates gas by being activated; and
   a single airbag that is fixed to a seatback frame inside the side portion, and in which an occupant restraining portion inflates and deploys toward a vehicle front side of the side portion in response to the gas being supplied into the occupant restraining portion, and a rearward extending portion inflates and deploys farther to a vehicle rear side than the portion where the airbag is fixed, in response to the gas being supplied into the rearward extending portion.

2. The vehicle far-side airbag apparatus according to claim 1, wherein
   the rearward extending portion inflates and deploys farther to the vehicle rear side than a back surface of the seatback.

3. The vehicle far-side airbag apparatus according to claim 1, wherein
   the rearward extending portion extends from a lower portion of a rear end portion of the occupant restraining portion.

4. The vehicle far-side airbag apparatus according to claim 1, further comprising:
   a front-rear partitioning tether that divides the airbag into a front bag portion and a rear bag portion, and in which a communication hole is formed for supplying the gas from the inflator housed inside the rear bag portion into the front bag portion, wherein
   the rearward extending portion is provided on the rear bag portion.

5. The vehicle far-side airbag apparatus according to claim 4, wherein
   the front-rear partitioning tether includes a transversely extending portion that extends toward a front side of the seatback from an up-down middle portion of a rear end of the airbag, an up-down extending portion that extends toward an upper side of the seatback from a longitudinally middle portion of a lower end of the airbag, and an arc-shaped portion provided between a front end of the transversely extending portion and an upper end of the up-down extending portion; and the arc-shaped portion forms an arc shape in which a side toward the front side of the seatback is convex when viewed from a side, and protrudes out farther toward the front side of the seatback than the up-down extending portion.

6. The vehicle far-side airbag apparatus according to claim 4, wherein the occupant restraining portion restrains a head and a front portion of a chest and an abdomen of an occupant with the front bag portion, and restrains a shoulder and a rear portion of the chest and the abdomen of the occupant with the rear bag portion.

7. The vehicle far-side airbag apparatus according to claim 1, wherein the airbag is housed in the seatback in a state in which, from a planar deployed state, an upper portion of the occupant restraining portion is folded toward an up-down center portion of the occupant restraining portion, the rearward extending portion is folded toward a connecting portion of the occupant restraining portion, and a lower portion of the occupant restraining portion is folded to near a connecting portion of the rearward extending portion, together with the folded upper portion of the occupant restraining portion.

8. The vehicle far-side airbag apparatus according to claim 1, wherein the inflator is housed in a flow straightening cloth;

an upper end opening that is open toward a vehicle upper side is formed in an upper end portion of the flow straightening cloth, a lower end opening that is open toward a vehicle lower side is formed in a lower end portion of the flow straightening cloth, and a middle opening that is open toward the vehicle rear side is formed in an up-down middle portion of the flow straightening cloth.

9. The vehicle far-side airbag apparatus according to claim 1, wherein a seat cover of the seatback is configured to deploy toward the vehicle rear side when the airbag inflates and deploys.

10. The vehicle far-side airbag apparatus according to claim 1, wherein a seatback board is attached to a back surface of the seatback;

the rearward extending portion protrudes out farther to the vehicle rear side than the seatback board, on the vehicle width direction center side with respect to the seatback board; and when the airbag is in an inflated and deployed state, a vehicle width direction outside surface of the rearward extending portion opposes a surface on the vehicle width direction center side of a rear portion side of a side frame of the seatback frame and an end portion on the vehicle width direction center side of the seatback board.

11. The vehicle far-side airbag apparatus according to claim 1, wherein the vehicle far-side airbag apparatus is mounted in each of left vehicle seat and a right vehicle seat.

12. The vehicle far-side airbag apparatus according to claim 11, wherein left and right airbags are both activated when a side collision of a vehicle is detected.

13. The vehicle far-side airbag apparatus according to claim 11, wherein the left and right airbags are configured to oppose each other and abut or be close together, when the left and right airbags inflate and deploy.

* * * * *